Patented Aug. 18, 1936

2,051,123

UNITED STATES PATENT OFFICE 2,051,123

PRODUCTION OF MIXTURES OF SECONDARY AND TERTIARY AROMATIC AMINES AND PROCESS OF PREPARING THEM

Hans Aickelin, Summit, N. J., assignor to General Aniline Works, Inc., New York, N. Y., a corporation of Delaware No Drawing. Application March 3, 1932, Serial No. 596,675. In Germany March 4, 1931

13 Claims. (Cl. 260—128)

The present invention relates to the production of mixtures of secondary and tertiary aromatic amines and to a process of preparing them.

I have found that mixtures of secondary and tertiary aromatic amines may be prepared by introducing compressed or liquefied anhydrous hydrochloric acid into primary aromatic amines or into mixtures of a lower aliphatic alcohol and a primary aromatic amine which are to be converted into mixtures of the corresponding secondary or tertiary aromatic amines. More particularly my invention relates to the production of aromatic amines, as, for instance, diphenyl amine, mono-ethyl aniline and diethyl aniline, by introducing compressed or liquefied anhydrous hydrochloric acid into the primary aromatic amines or into the mixture of a lower aliphatic alcohol and a primary aromatic amine which are to be converted into mixtures of the corresponding secondary or tertiary amines.

I prefer to carry out my process in the following manner:

The compressed or liquefied anhydrous hydrochloric acid is rapidly introduced into the primary amines or into the mixture of a lower aliphatic alcohol and the primary amines if a high temperature is desired to carry out the process, or is slowly introduced into the above starting materials, if a high temperature is not necessary and a high hydrochloric acid concentration is desired to carry out the process. The starting material is contained in a suitable vessel, such as, for instance, an enameled iron or acid-proof vessel. If pressure is desirable to carry out the process, I prefer to carry out the reaction in a pressure-tight, suitable vessel of the above described kind.

In the course of the process no external heat should be applied because the heat of solution or neutralization which is produced by the introduction of the compressed or liquefied anhydrous hydrochloric acid into the primary amines or into the mixture of the alcohol and the primary amine is sufficient to convert the primary amines into the secondary or tertiary amines. In cases where the heat of neutralization or of solution produced by the introduction of the compressed or liquefied anhydrous hydrochloric acid into the above starting material is not sufficient to promote the reaction, the primary amines or the mixture of the alcohol and the primary amine may be heated before they are brought into reaction with the compressed or liquefied anhydrous hydrochloric acid.

In cases where the reaction is to be carried out at a high temperature, the vessel must be well insulated to avoid loss of heat. However, if only a high concentration of hydrochloric acid is necessary, the vessel need not be insulated to avoid loss of heat.

The following examples will further illustrate the nature of the invention, but the same is not restricted thereto, all parts being by weight:

*Example 1.*—A mixture of 15 parts of aniline and of 15 parts of ethyl alcohol 95 per cent strength is introduced into a well insulated, pressure-tight autoclave which is lined with stoneware; 10 parts of liquid hydrochloric acid are rapidly introduced into the above mixture. The mixture of aniline and alcohol is preliminarily heated to such an extent that the heat so imparted to the mixture plus the heat of solution and neutralization produced by the dissolution of the hydrochloric acid in the alcohol and by the formation of the aniline hydrochloride cause the temperature of the mixture to rise to 200° C. After several hours, the reaction mixture is removed from the vessel and the mono-ethyl and diethyl aniline formed is worked up in the usual manner. The heat remaining may be employed for the next process. The process may be carried out continuously, which results in a more advantageous use of the neutralization heat. In this case the reaction vessel has preferably an U-shape and the reaction mixture is moved with a suitable velocity through the U-shaped vessel, whereby the reaction occurs immediately after the entrance of the reaction mixture in the vessel.

*Example 2.*—Aniline heated under pressure to 250° C. is forced into a well insulated, pressure-tight autoclave which is lined with stoneware. When forcing in liquid hydrochloric acid of about ⅙th of the weight of the used aniline the temperature of the reaction mixture rises to 260–280° C. When the temperature of the reaction mixture decreases to about 250° C., the mixture is removed and is worked up in the usual manner. In order to avoid any damage to the vessel when forcing in the highly heated aniline, it is necessary to heat the autoclave slowly to the necessary temperature. I prefer to gradually heat the autoclave by pumping aniline through the reaction vessel while slowly heating the aniline to the above temperature.

What I claim is:

1. The process which comprises acting upon aniline preheated to 250° C. with ⅙th of the weight of the aniline of compressed or liquefied hydrochloric acid while operating in a heat insulated pressure tight vessel.

2. The process which comprises acting upon a mixture of a primary aromatic amine of the benzene series and a lower aliphatic alcohol with compressed or liquefied anhydrous hydrochloric acid without application of external pressure and external heat during the reaction.

3. Process of preparing mixtures of secondary and tertiary aromatic amines of the benzene series which comprises acting upon primary aromatic amines of the benzene series with about half the equivalent amount of compressed or liquefied anhydrous hydrochloric acid, without application of external pressure and external heat.

4. Process of preparing a mixture of diphenyl amine and triphenyl amine which comprises acting upon aniline with compressed or liquefied anhydrous hydrochloric acid, without application of external pressure and external heat.

5. The process which comprises acting upon aniline preheated to about 250° C. with about half the equivalent amount of compressed or liquefied anhydrous hydrochloric acid while operating in a heat insulated pressure tight vessel.

6. Process of preparing a mixture of secondary and tertiary aromatic amines of the benzene series substituted in the N-atom by a lower aliphatic radical which comprises acting upon a mixture of a lower aliphatic alcohol and a primary aromatic amine of the benzene series with compressed or liquefied anhydrous hydrochloric acid, without application of external pressure and external heat during the reaction.

7. The process which comprises acting upon primary aromatic amines of the benzene series with compressed or liquefied anhydrous hydrochloric acid without application of external pressure and external heat.

8. The process as defined in claim 7 wherein the reaction is effected in a pressure tight vessel.

9. Process of preparing a mixture of monoethyl aniline and diethyl aniline which comprises acting upon a mixture of 15 parts by weight of aniline and 15 parts by weight of ethyl alcohol of 95 per cent strength with 10 parts by weight of compressed or liquefied anhydrous hydrochloric acid, the mixture being preliminarily heated to such an extent that the heat so supplied to the mixture plus the heat of solution and neutralization produced by the dissolution of the hydrochloric acid in the alcohol and by the formation of aniline hydrochloride cause the reaction mixture to assume a temperature of about 200° C., the reaction being effected without the application of external pressure and further quantities of external heat.

10. In the process of forming secondary and tertiary aromatic amines by reacting a primary aromatic amine of the benzene series with a substance capable of condensing therewith to form secondary and tertiary amines, selected from the group consisting of primary aromatic amines of the benzene series and lower aliphatic alcohols, the improvement which comprises effecting the reaction in the presence of compressed or liquefied anhydrous hydrochloic acid without application of external pressure and external heat during the reaction.

11. In the process of preparing secondary and tertiary amines of the benzene series by reacting a primary aromatic amine of the benzene series with a lower aliphatic alcohol, the improvement which comprises admixing a primary aromatic amine of the benzene series and a lower aliphatic alcohol with compressed or liquefied anhydrous hydrochloric acid at a temperature such that the application of external pressure and external heat during the reaction is unnecessary for substantial completion of the reaction.

12. In the process of preparing secondary and tertiary amines of the benzene series by the interreaction of primary amines of the benzene series, the improvement which comprises admixing a primary amine of the benzene series with compressed or liquefied anhydrous hydrochloric acid at a temperature such that the application of external pressure and external heat during the reaction is unnecessary for substantial completion of the reaction.

13. In the process of forming secondary and tertiary amines by reacting a primary aromatic amine of the benzene series with a substance capable of condensing therewith to form secondary and tertiary amines, selected from the group consisting of primary aromatic amines of the benzene series and lower aliphatic alcohols, the improvement which comprises admixing the reactants with compressed or liquefied anhydrous hydrochloric acid at a temperature such that the application of external pressure and external heat during the reaction is unnecessary for substantial completion of the reaction.

HANS AICKELIN.